(12) United States Patent
Hirotani et al.

(10) Patent No.: US 7,692,725 B2
(45) Date of Patent: Apr. 6, 2010

(54) TELEVISION RECEIVER AND CONTROL PROGRAM FOR THE TELEVISION RECEIVER

(75) Inventors: Takayuki Hirotani, Akiruno (JP); Ryohei Yamamoto, Tachikawa (JP)

(73) Assignee: Casio Computer Co., Ltd., Tokyo (JP)

( * ) Notice: Subject to any disclaimer, the term of this patent is extended or adjusted under 35 U.S.C. 154(b) by 1133 days.

(21) Appl. No.: 11/323,566

(22) Filed: Dec. 30, 2005

(65) Prior Publication Data

US 2006/0152629 A1 Jul. 13, 2006

(30) Foreign Application Priority Data

Jan. 11, 2005 (JP) ............................. 2005-003346

(51) Int. Cl.
*H04N 5/45* (2006.01)
*H04N 5/268* (2006.01)

(52) U.S. Cl. ...................... 348/565; 348/556; 348/706; 348/734

(58) Field of Classification Search ................. 348/564, 348/565, 588, 555, 556, 734, 706
See application file for complete search history.

(56) References Cited

U.S. PATENT DOCUMENTS

| | | | | |
|---|---|---|---|---|
| 4,725,888 A | * | 2/1988 | Hakamada | ................. 348/565 |
| 5,045,946 A | * | 9/1991 | Yu | ............................. 348/565 |
| 5,331,349 A | * | 7/1994 | Kim | .......................... 348/567 |
| 5,398,074 A | * | 3/1995 | Duffield et al. | ............. 348/564 |
| 5,420,641 A | * | 5/1995 | Tsuchida | .................... 348/556 |
| 5,432,561 A | * | 7/1995 | Strubbe | ...................... 348/565 |
| 5,442,406 A | * | 8/1995 | Altmanshofer et al. | ...... 348/588 |
| 5,453,796 A | * | 9/1995 | Duffield et al. | ............. 348/565 |
| 5,576,769 A | * | 11/1996 | Lendaro | ..................... 348/511 |
| 5,621,429 A | * | 4/1997 | Yamaashi et al. | ........... 715/803 |
| 5,650,827 A | * | 7/1997 | Tsumori et al. | ............... 725/59 |

(Continued)

FOREIGN PATENT DOCUMENTS

JP 2001-036835 A 2/2001

(Continued)

OTHER PUBLICATIONS

Extended European Search Report dated Sep. 12, 2008, issued in a counterpart European Application.

(Continued)

*Primary Examiner*—Brian P Yenke
(74) *Attorney, Agent, or Firm*—Frishauf, Holtz, Goodman & Chick, P.C.

(57) ABSTRACT

A display controller displays an image of a high resolution output from 13-Segment decoder on a main screen area of a display unit and displays an image of the standard resolution output from a single-Segment decoder on a subsidiary screen area of the display unit. When an instruction is entered from a user I/F to switch television broadcasts displayed respectively on the main screen area and on the subsidiary screen area of the display unit, a control unit instructs the display controller to display a still image of the standard resolution output from the single-Segment decoder on the main screen area until an image of a high resolution of the switched television broadcast is output from 13-Segment decoder.

12 Claims, 11 Drawing Sheets

U.S. PATENT DOCUMENTS

| | | | | |
|---|---|---|---|---|
| 5,671,019 | A * | 9/1997 | Isoe et al. | 348/565 |
| 5,760,842 | A * | 6/1998 | Song | 348/564 |
| 5,786,845 | A * | 7/1998 | Tsuria | 725/32 |
| 5,815,216 | A * | 9/1998 | Suh | 348/588 |
| 5,818,541 | A * | 10/1998 | Matsuura et al. | 348/565 |
| 5,880,728 | A * | 3/1999 | Yamaashi et al. | 715/803 |
| 5,900,916 | A * | 5/1999 | Pauley | 725/59 |
| 5,914,757 | A | 6/1999 | Dean et al. | |
| 5,977,963 | A * | 11/1999 | Gaughan et al. | 715/716 |
| 6,025,878 | A * | 2/2000 | Boyce et al. | 375/240.16 |
| 6,115,080 | A | 9/2000 | Reitmeier | |
| 6,188,448 | B1 * | 2/2001 | Pauley et al. | 348/731 |
| 6,204,887 | B1 * | 3/2001 | Hiroi | 348/565 |
| 6,310,655 | B1 * | 10/2001 | Godwin | 348/564 |
| 6,317,168 | B1 * | 11/2001 | Seo | 348/725 |
| 6,320,623 | B1 * | 11/2001 | Cavallerano et al. | 348/553 |
| 6,327,000 | B1 * | 12/2001 | Auld et al. | 348/441 |
| 6,335,764 | B1 * | 1/2002 | Hashimoto et al. | 348/565 |
| 6,373,527 | B1 * | 4/2002 | Lee | 348/564 |
| 6,466,272 | B1 * | 10/2002 | Arai et al. | 348/555 |
| 6,490,001 | B1 * | 12/2002 | Shintani et al. | 348/554 |
| 6,603,517 | B1 * | 8/2003 | Shen et al. | 348/565 |
| 6,710,815 | B1 * | 3/2004 | Billmaier et al. | 348/515 |
| 6,714,253 | B2 * | 3/2004 | Kim et al. | 348/556 |
| 6,927,801 | B2 * | 8/2005 | Yugami et al. | 348/458 |
| 7,030,932 | B2 * | 4/2006 | Han, II | 348/554 |
| 7,061,544 | B1 * | 6/2006 | Nonomura et al. | 348/568 |
| 7,124,365 | B2 * | 10/2006 | Cavallerano et al. | 715/716 |
| 7,187,418 | B2 * | 3/2007 | Phillips et al. | 348/565 |
| 7,227,583 | B2 * | 6/2007 | Sin | 348/570 |
| 7,268,830 | B2 * | 9/2007 | Lee | 348/565 |
| 7,477,326 | B2 * | 1/2009 | Jaffe | 348/726 |
| 2002/0008780 | A1 * | 1/2002 | Han | 348/554 |
| 2003/0005443 | A1 * | 1/2003 | Axelsson et al. | 725/46 |
| 2003/0030755 | A1 | 2/2003 | Ahn | |
| 2003/0223731 | A1 * | 12/2003 | Carlsgaard et al. | 386/46 |
| 2004/0181813 | A1 * | 9/2004 | Ota et al. | 725/131 |
| 2005/0046390 | A1 * | 3/2005 | Kimura | 320/132 |
| 2005/0168641 | A1 * | 8/2005 | Seo | 348/565 |
| 2006/0132647 | A1 * | 6/2006 | Hsieh et al. | 348/446 |

FOREIGN PATENT DOCUMENTS

| | | |
|---|---|---|
| JP | 2003-152579 A | 5/2003 |
| JP | 2004-289712 A | 10/2004 |
| WO | WO 98/48570 A2 | 10/1998 |
| WO | WO 99/63753 A1 | 12/1999 |

OTHER PUBLICATIONS

Japanese Office Action (and English translation thereof) dated Nov. 11, 2008, issued in a counterpart Japanese Application.

* cited by examiner

TELEVISION RECEIVER AND CONTROL PROGRAM FOR THE TELEVISION RECEIVER

CROSS-REFERENCE TO RELATED APPLICATION

This application is based upon the prior Japanese Patent Application No. 2005-3346 filed Jan. 11, 2005 and including specification, claims, drawings and summary. The disclosure of the above Japanese Patent Application is incorporated herein by reference.

DESCRIPTION OF THE RELATED ART

The present invention relates to a television receiver for receiving terrestrial digital television broadcasts and a control program for such television receiver.

Conventional technology for displaying a separate image on a subsidiary screen of a display unit over an image displayed on a main screen of the display unit in an overlapping manner, so-called "Picture in Picture" requires two separate equivalent routes for receiving television broadcasts. Since the subsidiary screen of the display unit is small in size, the image to be displayed on the subsidiary screen does not need so high resolution as the image to be displayed on the main screen. Therefore, it is not economical in costs and in power consumption to prepare a receiving circuit for the subsidiary screen, equivalent to a receiving circuit for the main screen.

Meanwhile, the terrestrial digital broadcasting service, which began December, 2003 in some areas, use a frequency bandwidth of 6 MHz divided into 13 Segments for transmitting television programs. A frequency bandwidth of 5.7 MHz among the 13 Segments is assigned to transferring images, and images of a high resolution, subjected to a compressing and encoding process in conformity with MPEG-2 standard are delivered. The 13-Segment television broadcasting service is intended to deliver television programs to be received by so-called stationary television receivers, and further it is planed that one-Segment among 13-Segments is spared for delivering images of the standard resolution to mobile devices such as cellular phones, portable television receivers, and the like. Further, using OFDM technique (Orthogonal Frequency Division Multiplexing), plural sorts of information including data, electronic program guide information (EPG) in addition to audio-visual information are multiplexed into a transport stream of the system to be delivered.

Expecting these services to be enjoyed, there have been made various proposals for the portable-type television receivers for receiving and displaying 13-Segment television broadcasts.

In one of these proposed digital television receivers, a tuner module including a tuner for receiving a digital broadcast signal and demodulator for demodulating the received signal is connected with a general apparatus including a signal processing unit for processing a video signal supplied from the tuner module and a display unit for displaying the signal from the processing unit, whereby a user can enjoy the digital broadcast program delivered by 13-Segment television broadcast. The proposed digital television receiver is arranged such that, when a size of an image to be displayed on the display unit of the general apparatus is equivalent to or larger than a predetermined size, the tuner module is controlled by the general apparatus so as to receive 13-Segment broadcast, and when a size of the image to be displayed on the display unit of the general apparatus is smaller than the predetermined size, the tuner module is controlled by the general apparatus so as to receive a singe-Segment broadcast. (Patent Document: Japanese Laid-open Patent Specification No. 2004-289712)

There is another proposal to provide PIP advantage (Picture in Picture), in which two television receiving sets are prepared, which are equipped with a processing circuit for a main screen and a processing circuit for a subsidiary screen, respectively, and an image of a high resolution to be displayed on the main screen, obtained from 13-Segment broadcast and an image of the standard resolution to be displayed the subsidiary screen, obtained from the single-Segment broadcast are combined into an image of PIP to be displayed on a display unit. For example, when the user finds on the subsidiary screen a scene attracting his or her attention, while news shows or dramas is displayed on the main screen, and live broadcasts of a baseball game and/or soccer game is displayed on the subsidiary screen, it may be possible for the user to enjoy television program which he or she is interested in on the main screen by switching the display on the subsidiary screen to the display on the main screen.

SUMMARY OF THE INVENTION

However, the user encounters a problem, when he or she finds an interesting program on the subsidiary screen of the display unit, and switches the program displayed on the subsidiary screen to that on the main screen and vice versa. In the terrestrial digital broadcast, since a moving image is compressed in conformity with MPEG-2 VIDEO standard, in which similarity between adjacent frames is used, a certain time is needed for the decoder to execute an expanding process and other processes on the compressed image supplied from the tuner. A longer time the decoder needs for processing the compressed image, higher resolution of the compressed image is delivered. In other words, a time that the decoder needs to process the compressed image of 13-Segment broadcast is longer than a time that the decoder needs to process the compressed image of the single-Segment broadcast.

Figure 11:
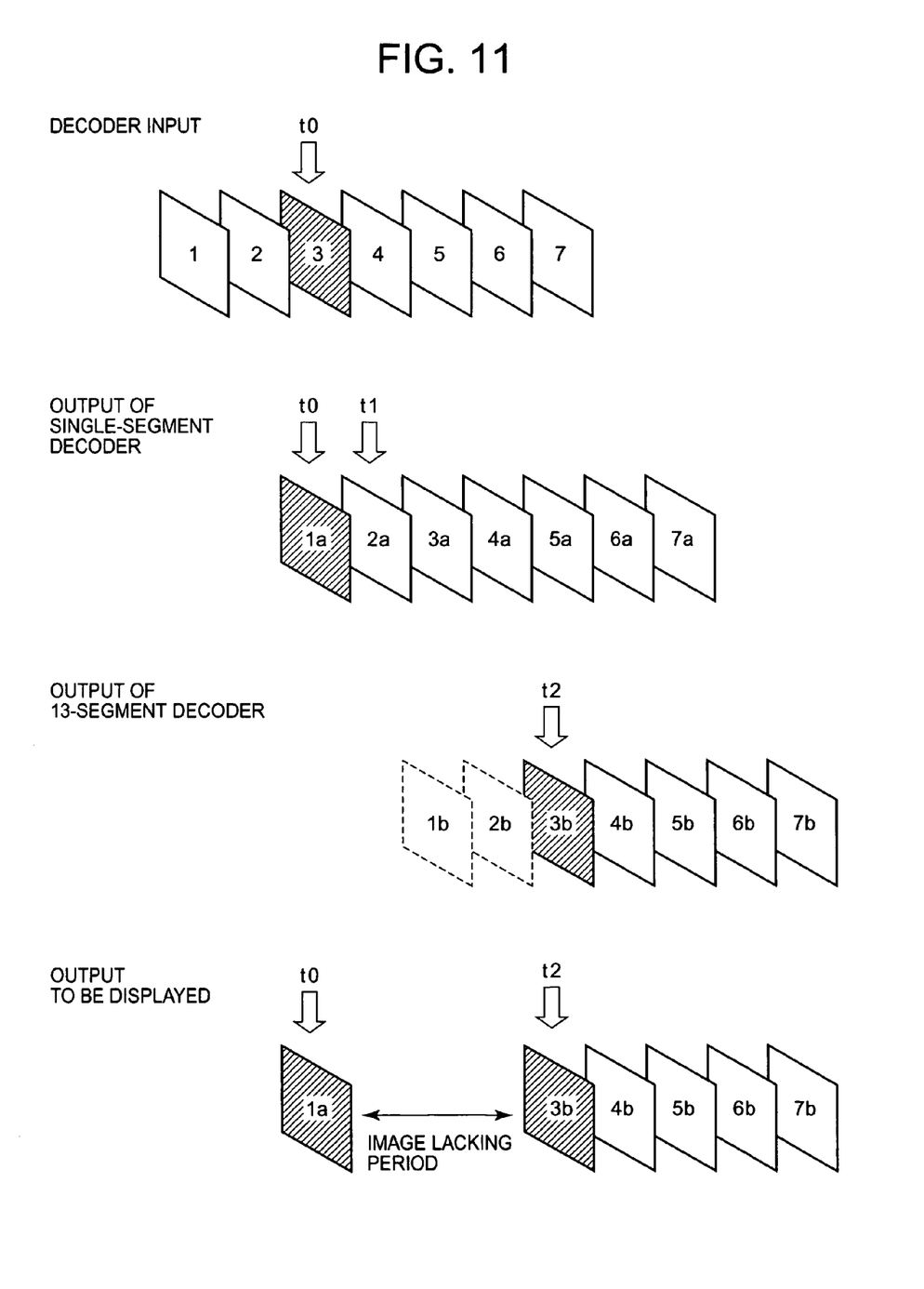
FIG. 11 is a view illustrating how images are switched in a conventional television receiver.

FIG. 11 is a view illustrating how images to be displayed on the main screen and subsidiary screen are switched. Compared with images of frames 1, 2, 3 . . . output from the tuner for receiving 13-Segment broadcast and the tuner for receiving the single-Segment broadcast to be input to the 13-Segment decoder and single-Segment decoder, images of frames 1a, 2a, 3a . . . of the standard resolution to be output from the single-Segment decoder, i.e. output of the single-Segment decoder delay by a time required for receiving the expanding and other process. Meanwhile, images of frames 1b, 2b, 3b . . . of a high resolution, i.e. output of 13-Segment decoder are output from the 13-Segment decoder later than the images output from the single-Segment decoder, because the images of a higher resolution require a longer time to be processed than the images of the standard resolution.

In FIG. 11, when an instruction (display switching instruction) is entered to switch images displayed on the main screen and subsidiary screen at a time "t0", the image of frame 1a output from the single-Segment decoder is displayed on the main screen, and then the image of frame 2a output from the single-Segment decoder is displayed on the subsidiary screen at a time "t1" upon receipt of the display switching instruction. However, a trouble is caused that no image is displayed on the main screen until 13-Segment decoder outputs the image of frame 3b at a time "t2". A time duration between the time "t0" and the time "t2" is about 2 or 3 minutes. But since the terrestrial digital broadcast system delivers 25 frames of images per second, this means the loss of 50 to 70 frames of images during such time duration, which can cause serious problem. For example, when the user is watching a live broadcast of a soccer game on the subsidiary screen, and switches the screens at the time of shooting chance, it can be caused that the most exciting scene has lapsed and the user sees only players raising cry of scoring a goal or looking up at the sky for missing a goal, when an image appears on the main screen again.

The present invention has been made to solve the above disadvantages in conventional apparatuses. It is an object of the invention to prevent images from missing at the time of switching television channels, while television channel of an image of a high resolution and television channel of an image of the standard resolution are received simultaneously, and displayed on the main screen and subsidiary screen of a display unit, respectively.

According to one aspect of the invention, solving the above problem, there is provided a television receiver for receiving television broadcasts each delivering one and the same television program compressed into images of more than two different resolutions, which comprises first signal processing means for receiving one television broadcast channel among plural television broadcast channels in response to a channel selector signal, and for expanding an image of a higher resolution among the images of different resolutions delivered by the received television broadcast channel and outputting the expanded image of a higher resolution; second signal processing means for receiving one television broadcast channel among plural television broadcast channels in response to the channel selector signal, and for expanding an image of a lower resolution among the images of different resolutions delivered by the received television broadcast channel and outputting the expanded image of a lower resolution; display control means for displaying the image output from the first signal processing means on a first area of display means, and for displaying the image output from the second signal processing means on a second area of the display means; and channel-switch instructing means responsive to a channel switch instruction entered through operation means to switch the television broadcast channel whose image is displayed on the first area of the display means to the television broadcast channel whose image is displayed on the second area of the display means, for instructing the display control means to display the image output from the second signal processing means on the first area of the display means until the first signal processing means which has received the television broadcast channel switched in response to the channel switch instruction outputs an image of such switched television broadcast channel.

DETAILED DESCRIPTION OF THE PREFERRED EMBODIMENTS

Now, the first embodiment to third embodiment of a television receiver according to the present invention will be described with reference to FIG. 1 to FIG. 10. Note that, though images, audio, text (text broadcasting), and Electronic Program Guide information (EPG) are multiplexed and delivered by terrestrial digital broadcasts, only images and Electronic Program Guide information are described in the following embodiments of the invention, and a description and drawing of audio and text, which are not related to the present invention, will be omitted.

Figure 1:
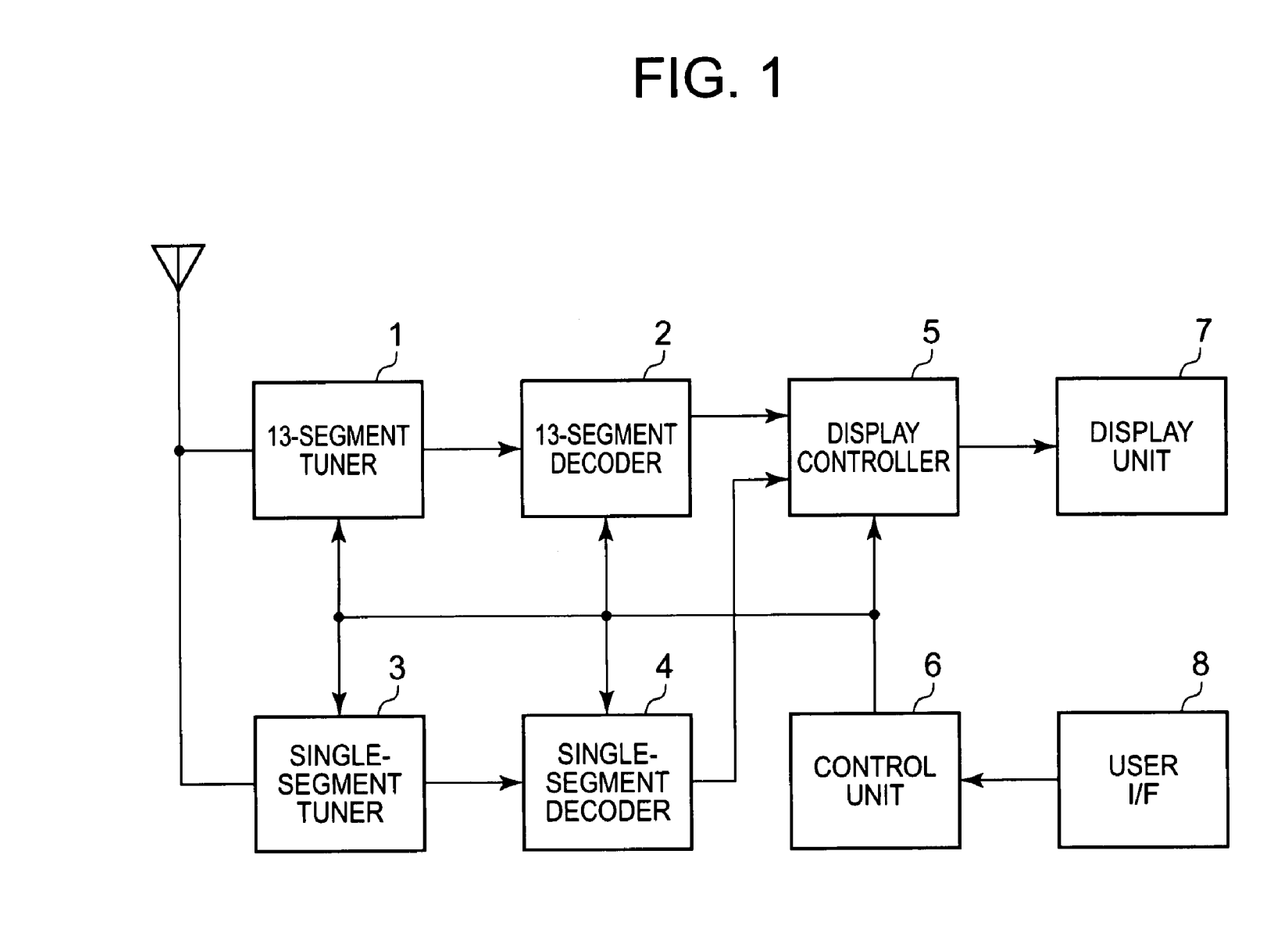
FIG. 1 is a block diagram showing a circuit configuration of a television receiver according to the first embodiment of the present invention.

The first embodiment of the invention will be described with reference to FIG. 1 to FIG. 5. FIG. 1 is a block diagram showing a circuit configuration of a television receiver according to the first embodiment of the invention, which receives the terrestrial digital broadcasts. In FIG. 1, 13-Segment tuner 1 responds to a channel selector signal to select and output one television channel from among received plural television channels each delivering 13-Segment broadcast of the terrestrial digital broadcast. A 13-Segment decoder 2 subjects the received signal output from 13-Segmant tuner 1, that is, a compressed image signal of a high resolution, to a decoding process (expanding process) and other processes, and outputs the processed signal. A single-Segment tuner 3 responds to a channel selector signal to select and output one television channel from among received plural television channels each delivering a single-Segment broadcast of the terrestrial digital broadcast. A single-Segment decoder 4 subjects the received signal output from single-Segment tuner 3, that is, a compressed image signal of the standard resolution, to a decoding process (expanding process) and other processes, and outputs the processed signal.

A display controller 5 combines the image signal of a high resolution supplied from 13-Segment decoder 3 with the image signal of the standard resolution supplied from the single-Segment decoder 4 into an image signal for one frame of image. A control unit 6 controls operation of 13-Segment tuner 1, 13-Segment decoder 2, single-Segment tuner 3, single-Segment decoder 4 and the display controller 5. A display unit 7 displays on its screen images transferred from the display controller 5 through two signal passes. A user interface (I/F) 8 is used to input a channel selecting instruction, display switching instruction, instruction of power saving during a display operation and the like to the control unit 6.

Figure 2:
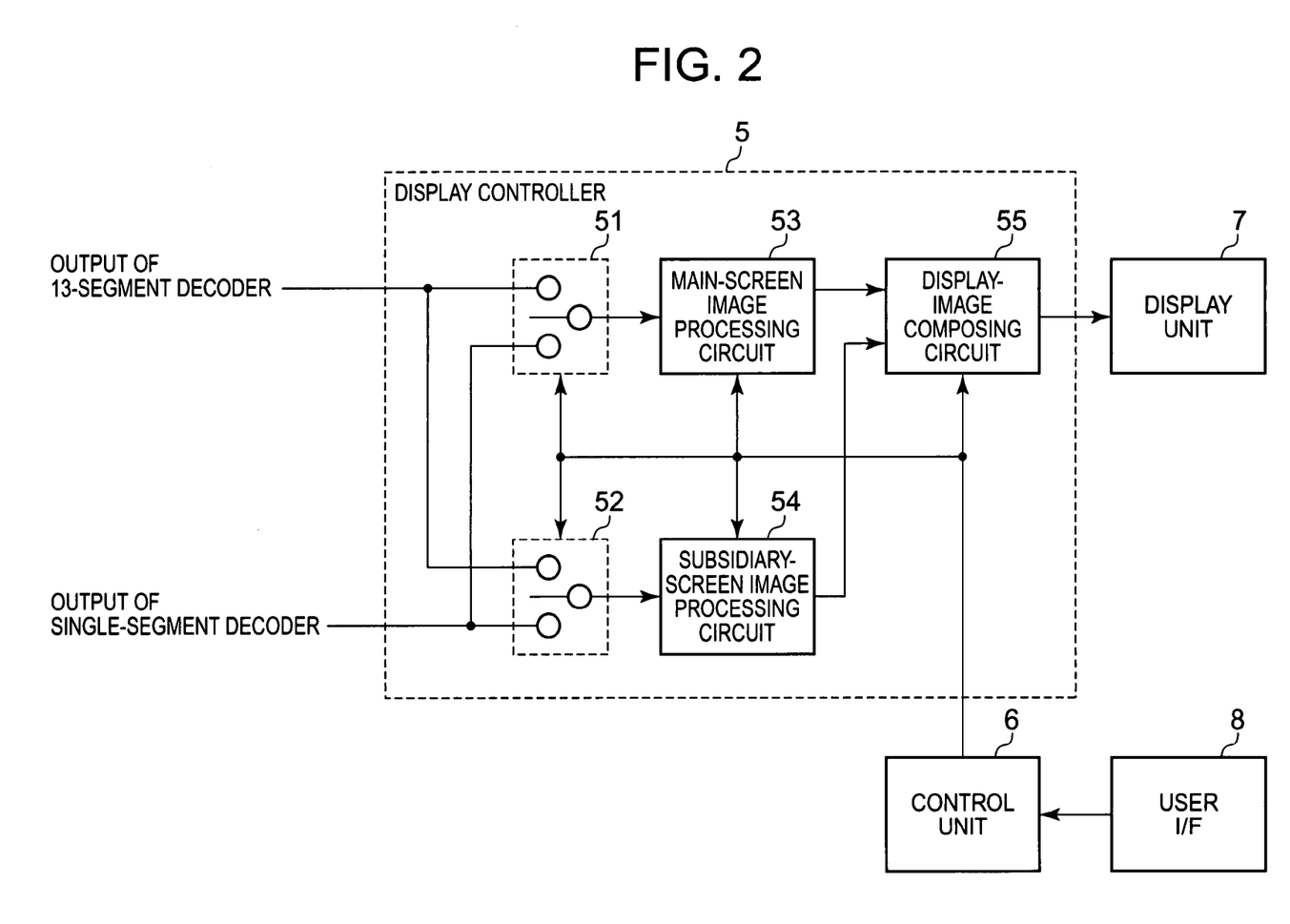
FIG. 2 is a block diagram showing in detail a display controller shown in FIG. 1.

FIG. 2 is a block diagram showing a circuit configuration of the display controller 5 shown in FIG. 1. The image signal output from 13-Segment decoder 2 is supplied to either of input terminals of respective selection switch circuits 51, 52. The image signal output from the single-Segment decoder 4 is supplied to the other one of the input terminals of respective selection switch circuits 51, 52. The selection switch circuit 51 selects and outputs one image signal supplied to either of its own input terminals in response to a switching control signal from the control unit 6. In a similar manner, the selection switch circuit 52 selects and outputs one image signal supplied to either of its own input terminals in response to the switching control signal from the control unit 6.

Figure 3:
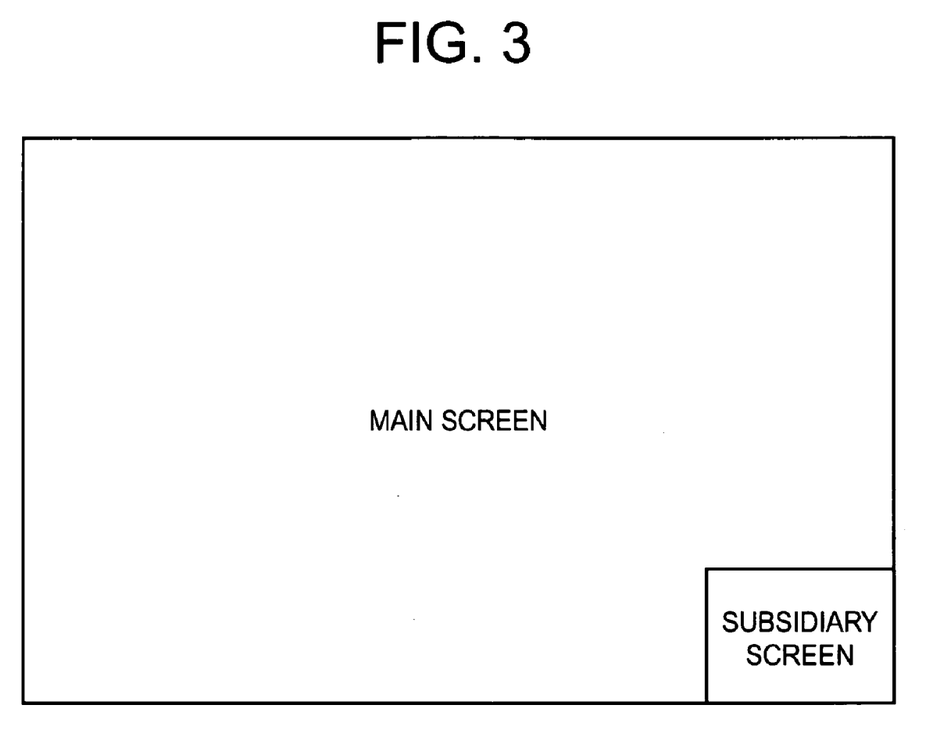
FIG. 3 is a view illustrating a display unit with a main screen area and subsidiary screen area of the television receiver in the first embodiment of the invention.

A main-screen image processing circuit 53 transforms the image signal output from the selection switch circuit 51 into an image signal of a predetermined size. Similarly, a subsidiary-screen image processing circuit 54 transforms the image signal output from the selection switch circuit 52 into an image signal of a predetermined size. A display-image composing circuit 55 combines the image signal output from the main-screen image processing circuit 53 and the image signal output from the subsidiary-screen image processing circuit 54 into a composed image signal to supply same to the display unit 7. As shown in FIG. 3, a display screen of the display unit 7 consists of a main screen area of a large area and a subsidiary screen area of a small area.

Figure 4:
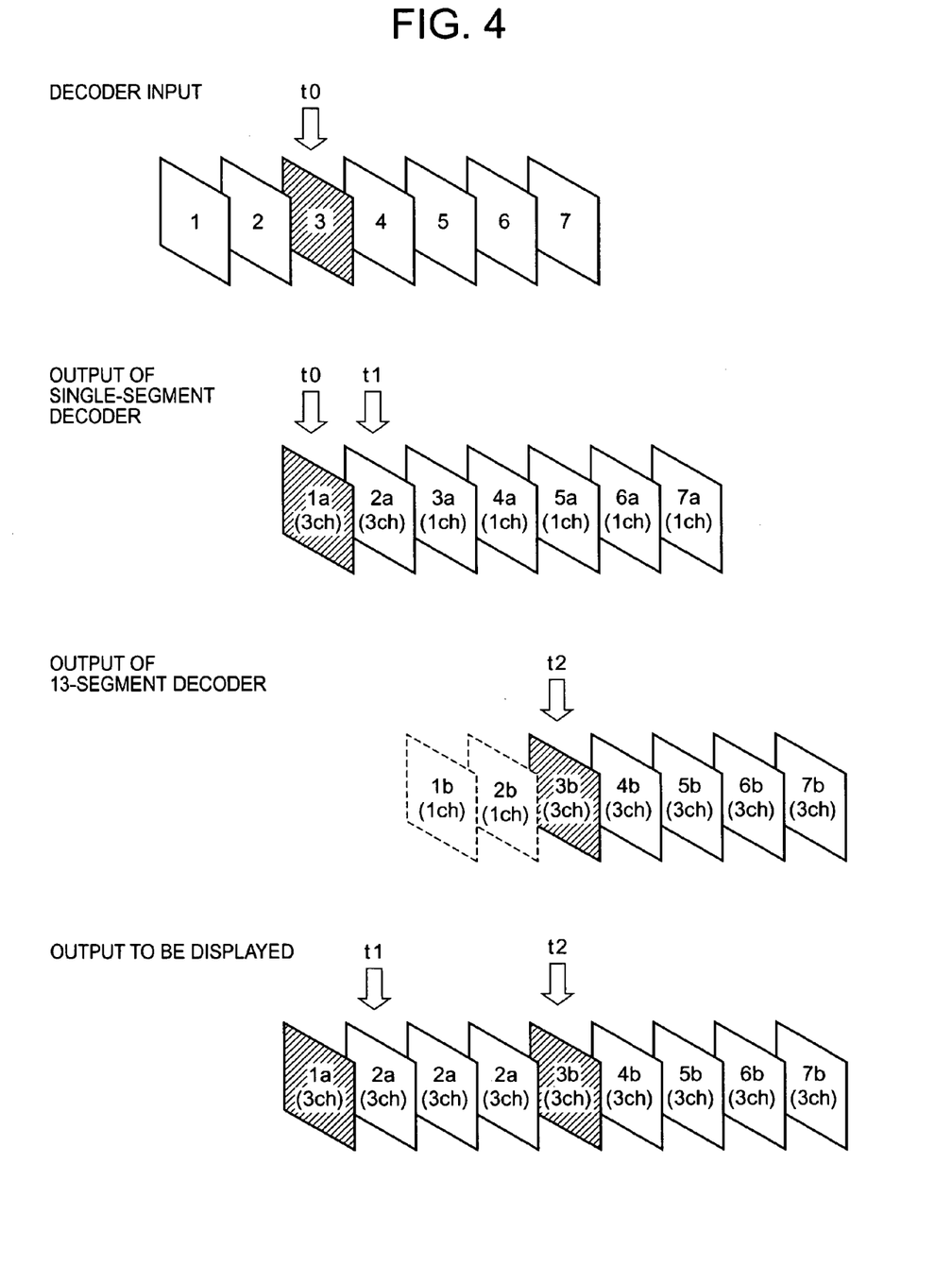
FIG. 4 is a view illustrating how images are switched in the first embodiment.
Figure 5:
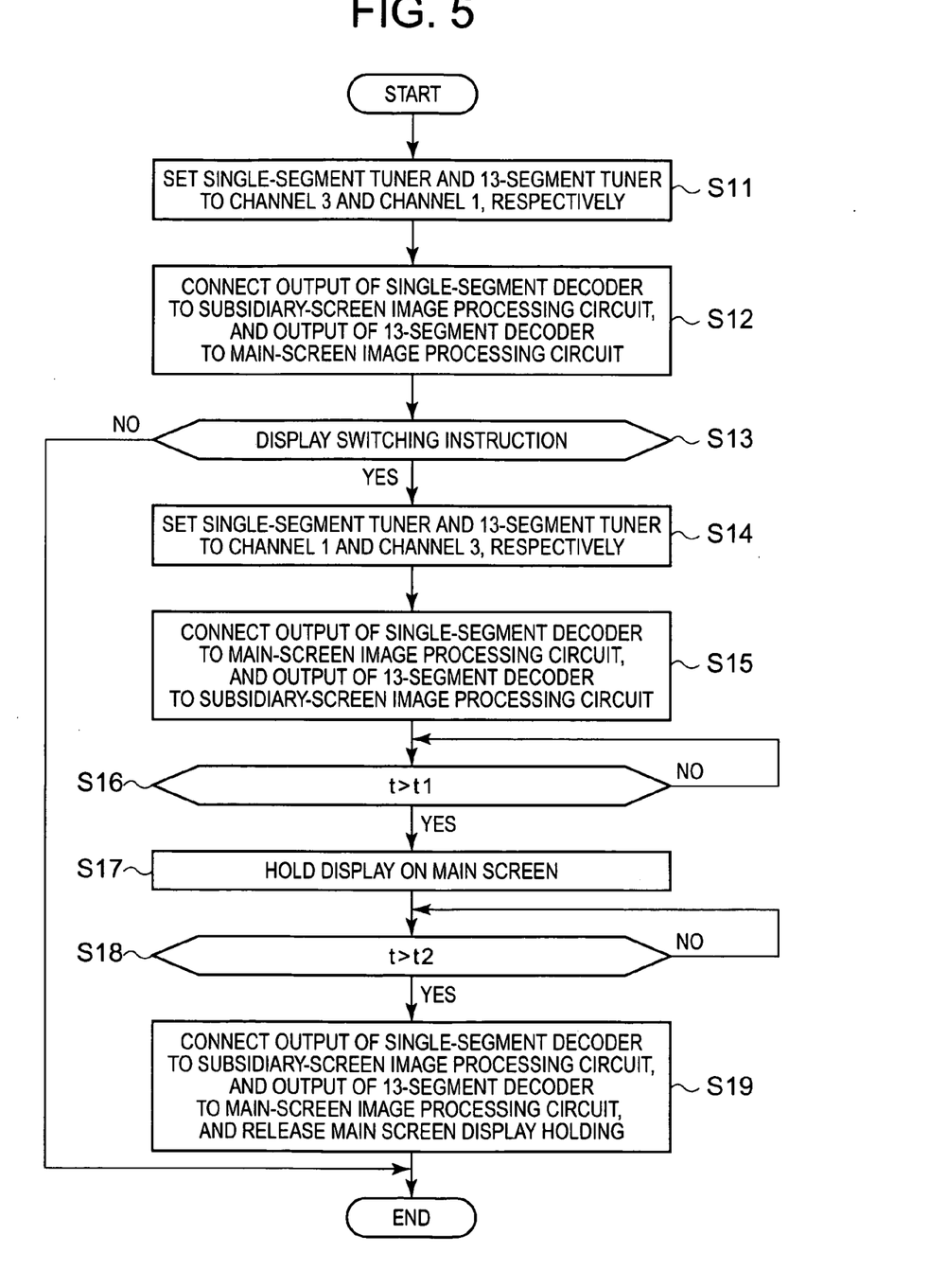
FIG. 5 is a flow chart of an image switching operation performed by a control unit in the first embodiment.

Now, a switching process performed by the control unit 6 will be described with reference to FIG. 4 and FIG. 5. FIG. 4 is a view illustrating how images to be displayed on the display unit 7 are switched. FIG. 5 is a flow chart of the switching process to be performed by the control 6. First, it is assumed that a user chooses two television channels that is, he or she tunes in to Channel 1 and Channel 3 to review television programs, and that an image of a high resolution delivered by 13-Segment broadcast of Channel 1 is displayed on the main screen area of the display unit 7, while an image of the standard resolution delivered by the single-Segment broadcast of Channel 3 is displayed on the subsidiary screen area thereof. Signals of Channels 1 and 3 input to the decoders are compressed data corresponding to an image frame 1, image frame 2, image frame 3, and so on.

More specifically, the control unit 6 controls the single-Segment tuner 3 to tune in to Channel 3, and controls 13-Segment tuner 1 to tune in to Channel 1 at step S11 in FIG. 5. Further, the control unit 6 controls the selection switch circuit 52 to connect the output of the single-Segment decoder 4 to the subsidiary-screen image processing circuit 54 and controls the selection switch circuit 51 to connect the output of 13-Segment decoder 2 to the main-screen image processing circuit 53 at step S12. With this arrangement, it is judged whether the display switching instruction has been entered from the user I/F 8 or not. It is assumed that the display switching instruction has been given at a time "t0" (at step S13). When the display switching instruction has been entered, the control unit 6 controls the single-Segment tuner 3 to tune in to Channel 1, and controls 13-Segment tuner 1 to tune in to Channel 3 at step S14. Further, the control unit 6 controls the selection switch circuit 51 to connect the output of the single-Segment decoder 4 to the main-screen image processing circuit 53 and controls the selection switch circuit 52 to connect the output of 13-Segment decoder 2 to the subsidiary-screen image processing circuit 54 at step S15. With this arrangement, the frame 3 is supplied to the decoder input, and the frame 2 of Channel 3 is already subjected to a signal process by the single-Segment decoder 4.

Then, the control unit 6 judges at step S16, whether a time "t" has lapsed a time "t1", which is required by the subsidiary-screen image processing circuit 54 to process a compressed image of one frame. When it is determined that the time "t" has lapsed the time "t1", the single-Segment decoder 4 outputs data of a frame 2a of Channel 3, as shown in FIG. 4. But a time "t" has not yet reached a time "t2", which is required by the main-screen image processing circuit 53 to process a compressed image of one frame. Therefore, the control unit 6 keeps holding the main-screen display and controls so as to display a still image of the frame 2a of Channel 3 at step S17. And then, the control unit 6 judges at step S18, whether a time "t" has lapsed the time "t2", which is required by the main-screen image processing circuit 53 to process a compressed image of one frame. When it is determined that a time "t" has lapsed the time "t2", the control unit 6 controls the selection switch circuit 52 to connect the output of the single-Segment decoder 4 to the subsidiary-screen image processing circuit 54, and controls the selection switch circuit 51 to connect the output of 13-Segment decoder 2 to the main-screen display processing circuit 53, releasing holding the main-screen display at step S19.

As shown in FIG. 4, after the single-Segment decoder 4 has been connected to the subsidiary-screen image processing circuit 54, the frame 2a of Channel 3 output from the single-Segment decoder 4 is displayed on the main-screen area at the time "t1" and meanwhile the still image of the frame 2a of Channel 3 is kept displayed on the main-screen area until the time "t2" is reached. When a time "t" has reached the time "t2", a frame 3b of Channel 3 output from the 13-Segment decoder 2 is displayed on the main screen area and a frame 5a of Channel 1 output from the single-Segment decoder 4 is displayed on the subsidiary screen area.

As described above, in the first embodiment of the present invention, 13-Segment tuner 1 responds to the channel selector signal to receive one channel among plural channels of television broadcasts each delivering a compressed image having a high resolution and ranging over 13 Segments, and 13-Segment decoder 2 subjects the compressed image of a high resolution, received by 13-Segment tuner 1, to signal processes including an expanding process, and outputs the processed signal. Meanwhile, the single-Segment tuner 3 responds to the channel selector signal to receive one channel among plural channels of television broadcasts each delivering a compressed image of the standard resolution, and the single-Segment decoder 4 subjects the compressed image of the standard resolution, received by the single-Segment tuner 3, to signal processes including the expanding process, and outputs the processed signal. The display controller 5 displays the image of a high resolution output from 13-Segment decoder 2 on the main screen area of the display unit 7 and the image of the standard resolution output from the single-Segment decoder 4 on the subsidiary screen area of the display unit 7. When an instruction is entered from the user I/F 8 to switch the television broadcast displayed on the main screen area of the display unit 7 to that displayed on the subsidiary screen area of the display unit 7 and vice versa, the control unit 6 gives an instruction to the display controller 5 so as to display a still image of the standard resolution output from the single-Segment decoder 4 on the main screen area of the display unit 7 until 13-Segment decoder 2 decodes television broadcast of the channel that has been switched in response to such switching instruction and outputs an image of a high resolution.

As has been described above, when television channel of an image of a high resolution and other television channel of an image of the standard resolution are received simultaneously and are displayed on the main screen area and subsidiary screen area of the display unit 7, respectively, and even if an instruction is given to change or switch the television channels, the television receiver according to the present embodiment of the invention can prevent lack of an image to be displayed on the main screen area of the display unit 7 at any time when the TELEVISION channels are changed or switched.

Figure 6:
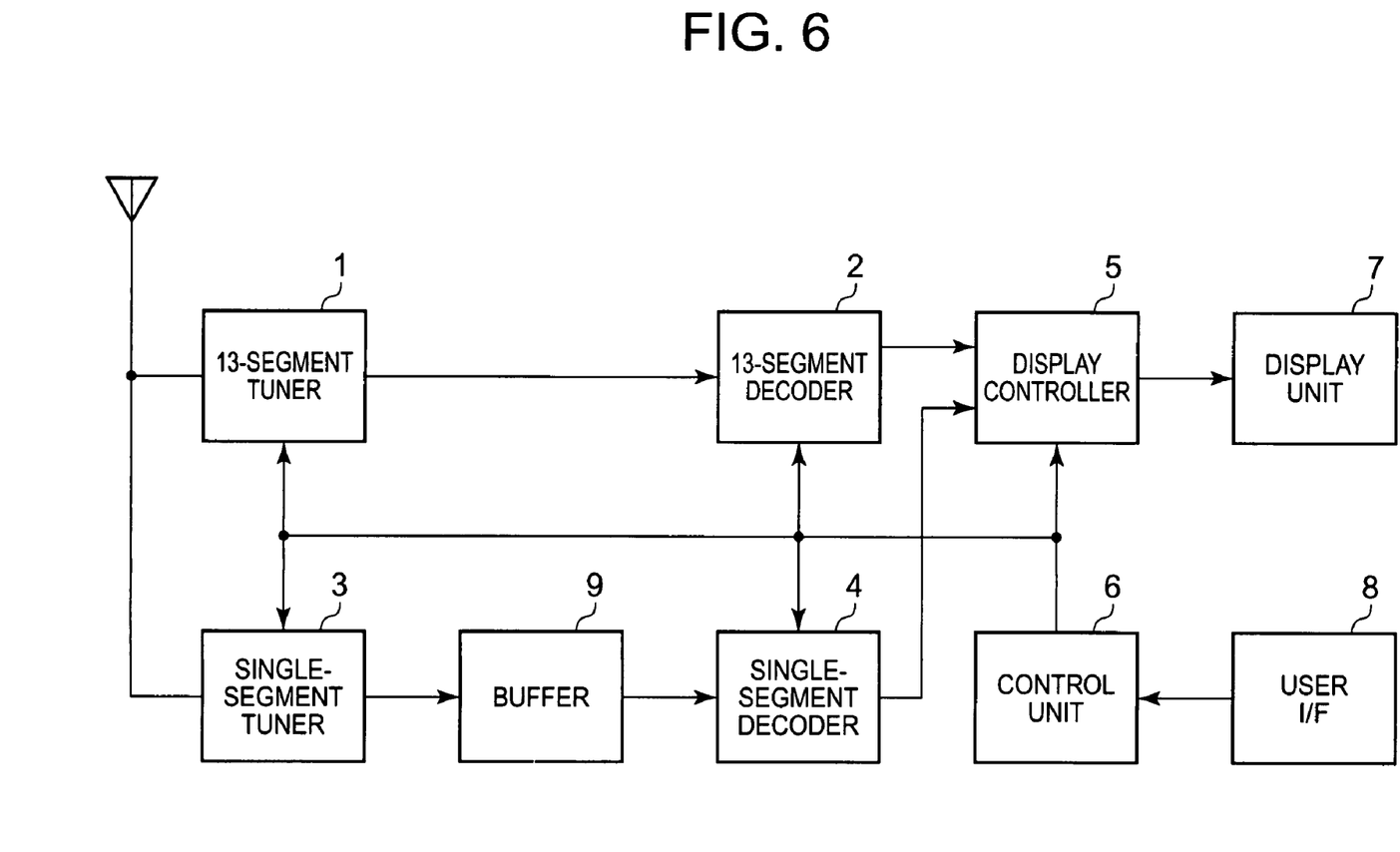
FIG. 6 is a block diagram showing a circuit configuration of a television receiver according to the second embodiment of the present invention.
Figure 7:
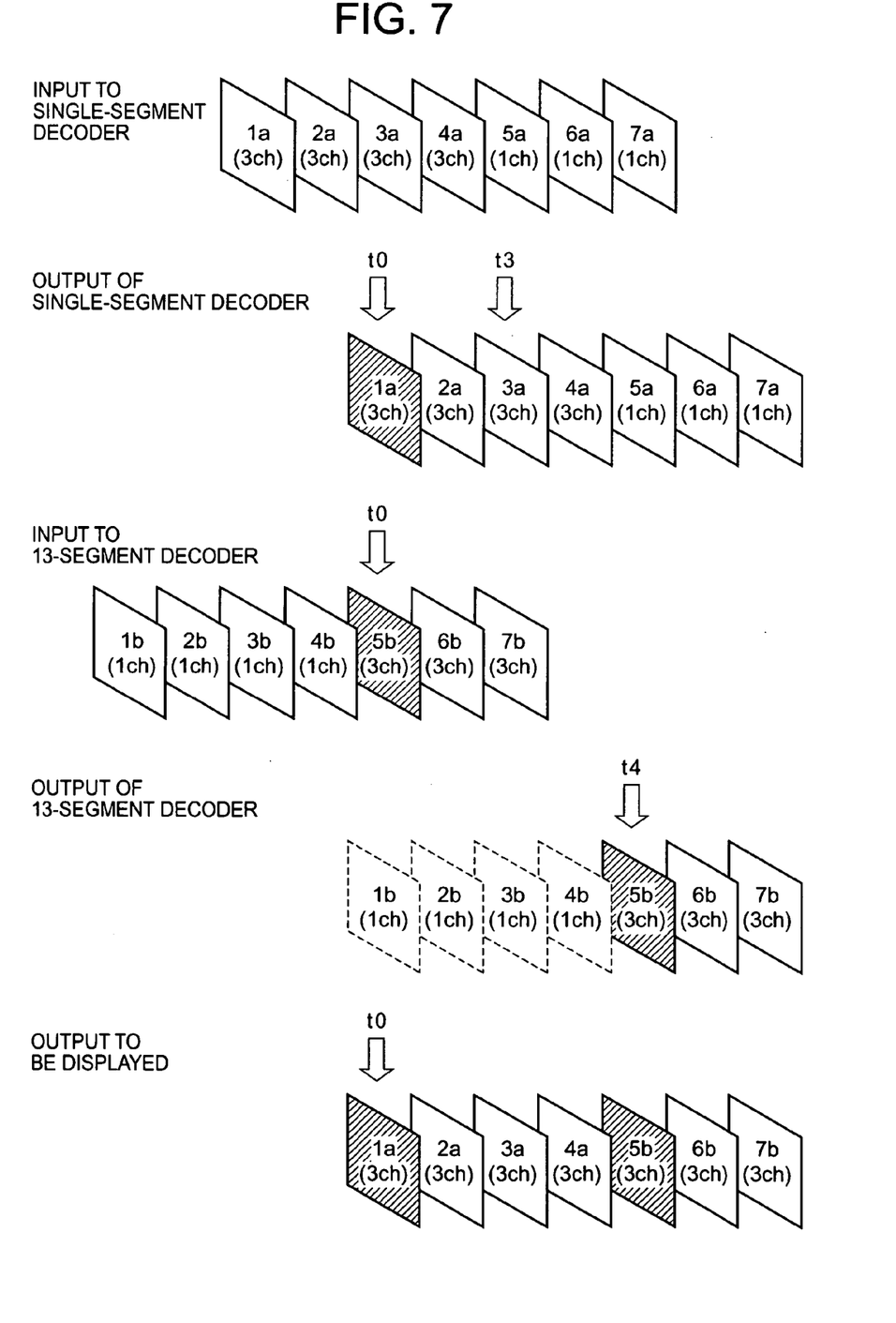
FIG. 7 is a view illustrating how images are switched in the second embodiment.

Now, the second embodiment of the present invention will be described with reference to FIG. 6 to FIG. 8. FIG. 6 is a block diagram showing a circuit diagram of a television receiver according to the second embodiment, for receiving the terrestrial digital television broadcasts. As shown in FIG. 6, there is provided a buffer 9 between the single-Segment tuner 3 and the single-Segment decoder 4, which buffer stores compressed images of two frames. The remaining configuration of the television receiver is the same as that of the first embodiment shown in FIG. 1.

In FIG. 6, a compressed image of a high resolution and a compressed image of the standard resolution are output simultaneously from 13-Segment tuner 1 and single-Segment tuner 3, respectively. The compressed image of the standard resolution output from the single-Segment tuner 3 is supplied to the buffer 9 and temporarily stored therein. Therefore, the compressed image of the standard resolution is input to the single-Segment decoder 4 behind by a time corresponding to two frames of images in comparison with the timing at which the compressed image of a high resolution output from 13-Segment tuner 1 is supplied to 13-Segment decoder 5, as shown in FIG. 7.

The switching process performed by the control unit 6 will be described with reference to FIG. 7 and FIG. 8. FIG. 7 is a view illustrating how frames of an image are switched, and FIG. 8 is a flow chart of the switching process performed by the control unit 6. Similarly to the first embodiment, it is assumed that the user selects two television channels, that is, Channel 1 and Channel 3, and reviews Channel 1 broadcast, i.e. an image of a high resolution of 13-Segment broadcast, on the main screen area of the display unit 7 and Channel 3, i.e. an image of the standard resolution of the single-Segment broadcast on the subsidiary screen area of the display unit 7.

Figure 8:
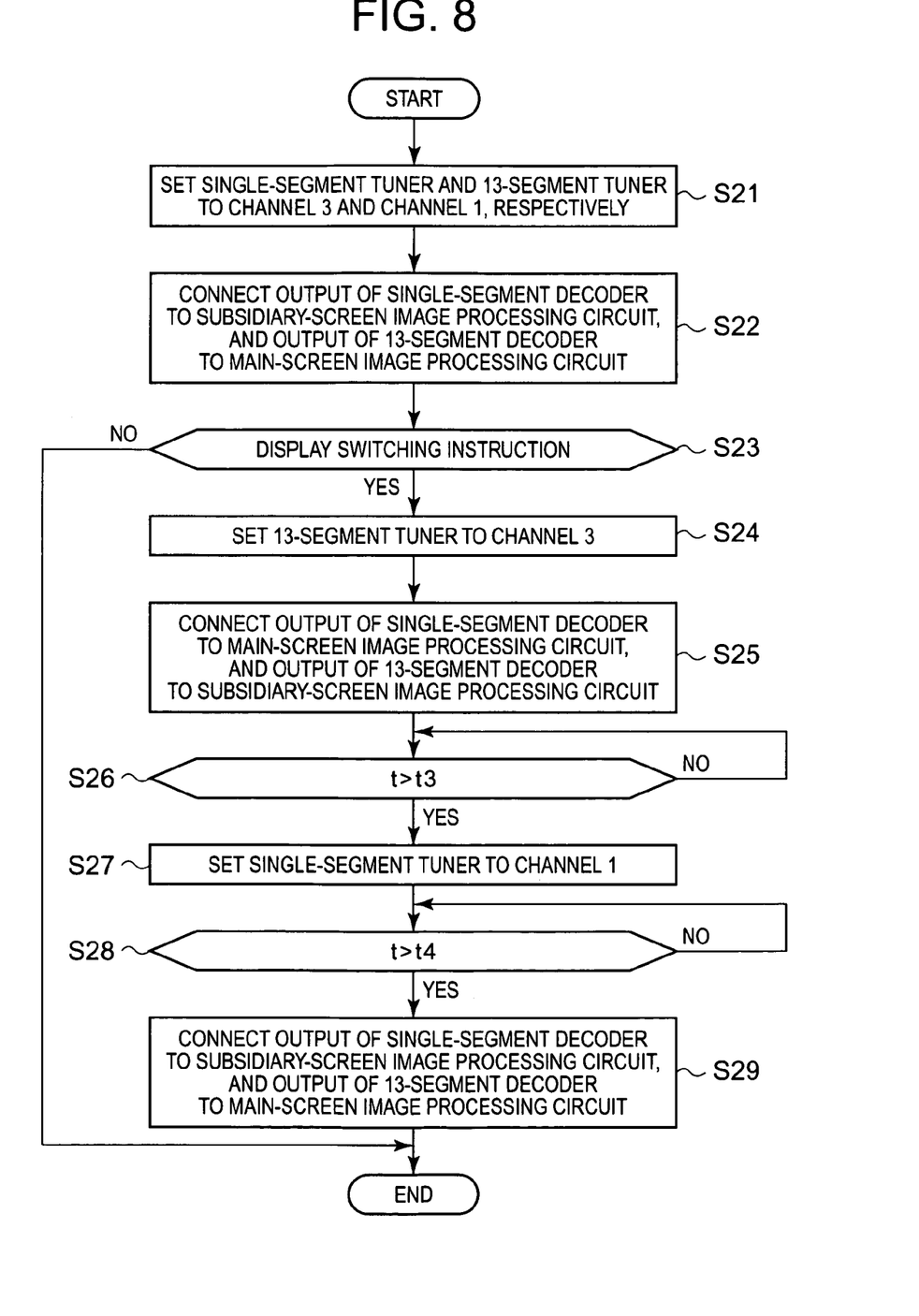
FIG. 8 is a flow chart of an image switching operation performed by a control unit in the second embodiment.

The control unit 6 controls the single-Segment tuner 3 to tune in to Channel 3 and 13-Segment tuner 1 to tune in to Channel 1 at step S21 in FIG. 8. Further, the control unit 6 controls the selection switch circuit 52 to connect the output of the single-Segment decoder 4 to the subsidiary-screen image processing circuit 54, and controls the selection switch circuit 51 to connect the output of 13-Segment decoder 2 to the main-screen image processing circuit 53 at step S22. With this arrangement, it is judged at step S23 whether a display switching instruction has been entered through the user I/F 8 at a timing of "t0" shown in FIG. 7 or not. When it is determined that the display switching instruction has been entered at a time "t0", the control unit 6 controls 13-Segment tuner 1 to tune in to Channel 3 at step S24. As the result, both the single-Segment tuner 3 and 13-Segment tuner 1 receive Channel 3 television broadcast. Then, the control unit 6 controls the selection switch circuit 52 to connect the output of the single-Segment tuner 1 to the main screen image processing circuit 53, and controls the selection switch circuit 52 to connect the output of 13-Segment decoder 2 to the subsidiary screen image processing circuit 54 at step S25. With this arrangement, since the television broadcast channel to be supplied to the single-Segment decoder 4 has not been changed, the single-Segment decoder 4 outputs an image frame 2a of Channel 3 following the image frame 1a of the same Channel 3.

Then, the control unit 6 judges at step S26, whether a time "t" has reached a time "t3", at which an image frame 3a is output from the single-Segment decoder 4. When it is determined that a time "t" has reached the time "t3", the control unit 6 controls the single-Segment tuner 3 to tune in to Channel 1 at step S27. Therefore, the single-Segment decoder 4 receives an image frame 5a, image frame 6a, image frame 7a of Channel 1 and so on, after receiving an image frame 4a of Channel 3. Then, the control unit 6 judges at step S28, whether a time "t" has reached a time "t4", at which 13-Segment decoder 2 outputs an image frame of Channel 3. When a time "t" has reached the time "t4", the control unit 6 controls the selection switch circuit 52 to connect the output of the single-Segment decoder 4 to the subsidiary screen image processing circuit 52, and controls the selection switch circuit 51 to connect the output of 13-Segment decoder 2 to the main screen image processing circuit 53 at step S29.

As the result, on the main screen area of the display unit 7, images of the standard resolution, i.e. the image frame 1a, image frame 2a, image frame 3a, and image frame 4a of Channel 3 television broadcast are successively displayed before a time "t" has reached the time "t4", and images of a high resolution, i.e. an image frame 5b, image frame 6b, image frame 7b of Channel 3 broadcast, and so on are displayed, after a time "t" has reached the time "t4".

As described above, in the second embodiment of the invention, 13-Segment tuner 1 responds to the channel selector signal to receive one channel of plural channels of television broadcasts each delivering a compressed image having a high resolution and ranging over 13 Segments, and 13-Segment decoder 2 subjects the compressed image of a high resolution, received by 13-Segment tuner 1, to signal processes including an expanding process, and outputs the processed data. Meanwhile, the single-Segment tuner 3 responds to the channel selector signal to receive one channel of plural channels of television broadcasts each delivering a compressed image of the standard resolution, and stores the received compressed image of the standard resolution in the buffer 9. The single-Segment decoder 4 subjects the compressed image of the standard resolution output from the buffer 9 to signal processes including the expanding process, and outputs the processed signal. The display controller 5 displays the image of a high resolution output from 13-Segment decoder 2 on the main screen area of the display unit 7 and the image of the standard resolution output from the single-Segment decoder 4 on the subsidiary screen area of the display unit 7. When an instruction is entered though the user I/F 8 to switch the television broadcast displayed on the main screen area of the display unit 7 to that displayed on the subsidiary screen area of the display unit 7 and vice versa, the control unit 6 gives an instruction to the display controller 5 so as to display a still image of the standard resolution which is read out and subjected to a process, including a signal expanding process, performed by the single-Segment decoder 4, on the main screen area of the display unit 7 until 13-Segment decoder 2 decodes the television broadcast of the channel that has been switched in response to such switching instruction, and outputs an image of a high resolution.

In the same manner as in the first embodiment, when a television broadcast channel delivering an image of a high resolution and other television channel delivering an image of the standard resolution are received simultaneously and displayed on the main screen area and subsidiary screen area of the display unit 7, respectively, and even if an instruction is given to change or switch the television channels, the television receiver of the second embodiment of the invention can prevent lack of an image to be displayed on the main screen area of the display unit 7 at any time when the television channels are changed or switched.

Figure 9:
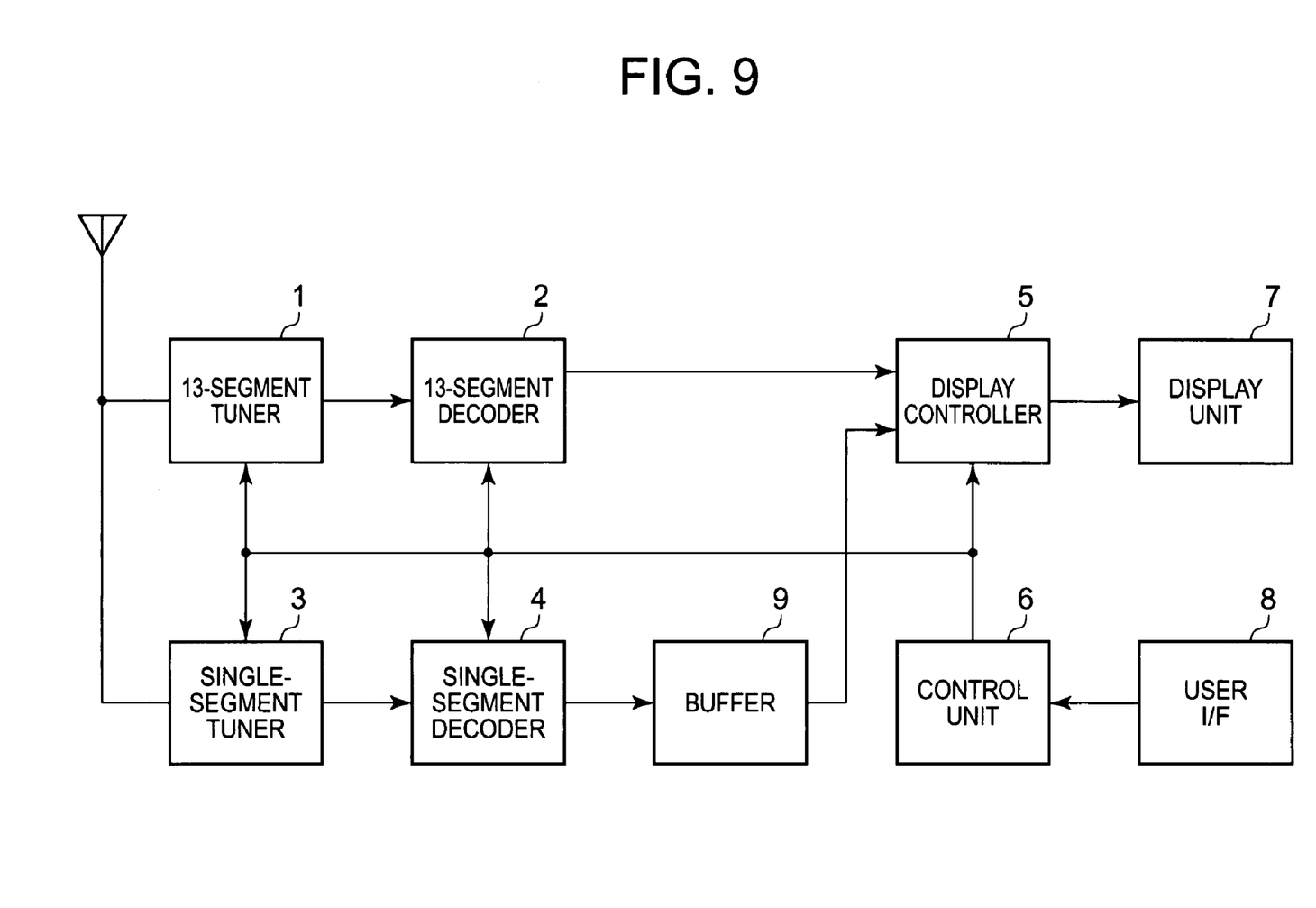
FIG. 9 is a block diagram showing a circuit configuration of a television receiver according to the modified second embodiment of the present invention.

A modification of the second embodiment of the invention will be described. FIG. 9 is a block diagram showing a circuit configuration of a television receiver according to the modified second embodiment. In the second embodiment of the television receiver shown in FIG. 6, there is provided a buffer 9 between the single-Segment tuner 3 and the single-Segment decoder 4, but in the present modified embodiment the buffer 9 is provided between the single-Segment decoder 4 and the display controller 5. In other words, the image of the standard resolution processed by the single-Segment decoder 4 is stored in the buffer 9. When an instruction is entered from the user I/F 8 to switch the television broadcast displayed on the main screen area of the display unit 7 to that displayed on the subsidiary screen area of the display unit 7 and vice versa, the control unit 6 gives an instruction to the display controller 5 so as to display a still image of the standard resolution which the single-Segment decoder 4 subjects to a process, including a signal expanding process, and stores in the buffer 9, on the main screen area of the display unit 7 until 13-Segment decoder 2 decodes the television broadcast of the channel that has been switched in response to such switching instruction and outputs an image of a high resolution.

Therefore, in the same manner as in the second embodiment, when a television channel delivering an image of a high resolution and other television channel delivering an image of the standard resolution are received simultaneously and displayed on the main screen area and subsidiary screen area of the display unit 7, respectively, and even if an instruction is given to change or switch the television channels, the television receiver of the modified second embodiment of the invention can prevent lack of an image to be displayed on the main screen area of the display unit 7 at any time when the television channels are changed or switched.

Figure 10:
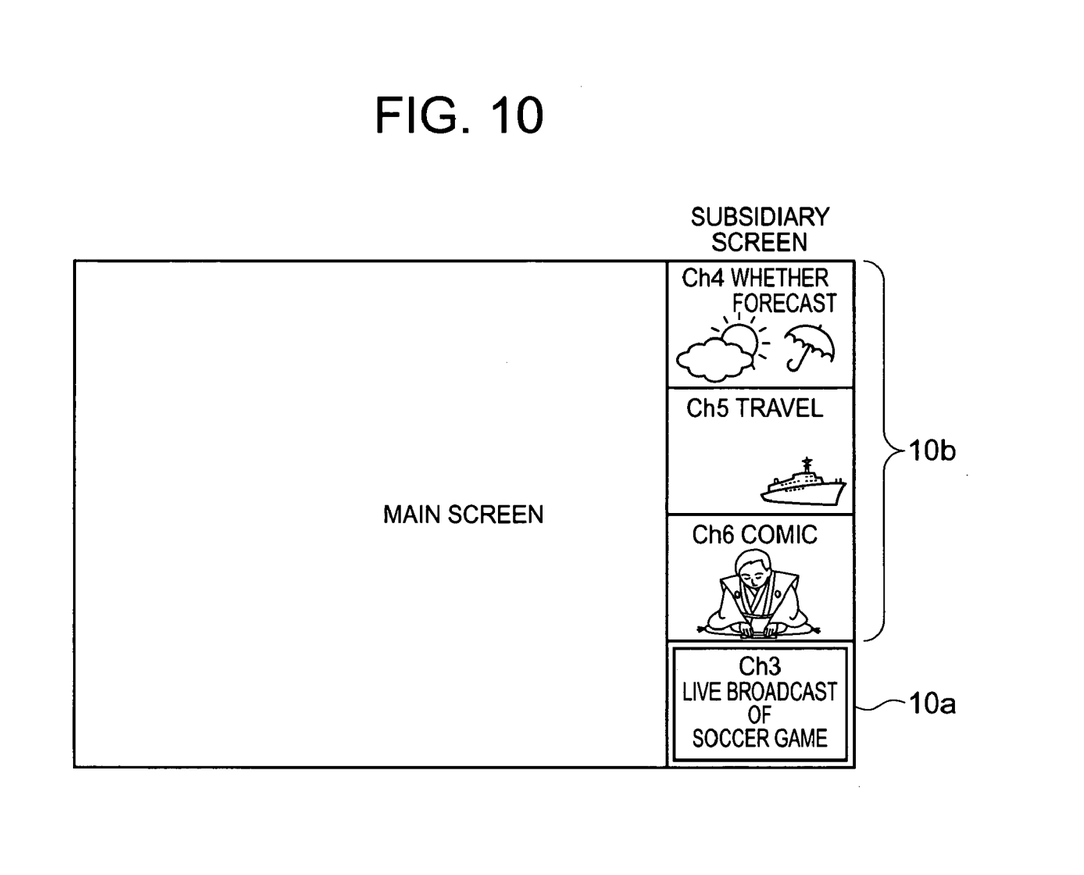
FIG. 10 is a view illustrating a display unit with a main screen area and subsidiary screen areas of the television receiver in the third embodiment of the invention.

Now, a television receiver according to the third embodiment of the invention will be described. FIG. 10 is a view illustrating the main screen area and subsidiary screen area of the display unit 7 of the television receiver according to the third embodiment. On the subsidiary screen area 10a of the display unit 7, a moving image of the single-Segment broadcast is displayed in the same manner as in the first and second embodiment. On the other subsidiary screen areas 10b of the display unit 7, still images produced based on programs of television broadcasts of channels other than those which the television receiver is receiving, are displayed. These still images are produced based on the programs of television channels by the single-Segment tuner and decoder before the user reviews the same. An image and the still image displayed on the main screen area and subsidiary screen area 10a of the display unit 7 are switched in the same manner as in the first and second embodiment, but in the third embodiment, a still image channel can be received and displayed on the main screen area of the display unit 7 or on its subsidiary screen area 10a in response to operation of the user I/F 8.

As described above, in the third embodiment of the invention, with respect to television broadcasts of channels other than television channel whose image of a high resolution is displayed on the main screen area of the display unit 7, and the television channel whose image of the standard resolution is displayed on its subsidiary screen area 10a, still images are previously created on the basis of the contents of such television broadcasts by the single-Segment tuner and decoder to be displayed on the subsidiary screen areas 10b of the display unit 7.

As described above, the user can easily confirm the contents of television channels which are not being received by reviewing the still images which are previously created by the single-Segment tuner and decoder based the contents of such television channels. Therefore, the user can check the progresses of the programs of all television channels, without changing television channels frequently or performing troublesome operation to turn off the main screen display to confirm electronic program guide information.

The television receivers according to the embodiments described above are arranged such that an image of a high resolution delivered by 13-Segment broadcast and an image of the standard resolution delivered by the single-Segment broadcast are displayed on the main screen are of the display unit and on its subsidiary screen area, respectively, but the television receiver may be modified such that an image is displayed only on the subsidiary screen area of the display unit, leaving its main screen area idle. In a portable-type television receiver operated by a battery, 13-Segment tuner 1 and 13-Segment decoder 2 for receiving an image of a high resolution delivered by 13-Segment television broadcast consume a considerable amount of battery power. The following modification will be effective in reducing battery power consumption. The television receiver is constructed such that an instruction of saving battery power during displaying operation can be entered through the user I/F 8, and that when such instruction is entered, 13-Segment tuner 1 and 13-Segment decoder 2 are brought into an idle state, while only the single-Segment tuner 3 and single-Segment decoder 4, both consuming less battery power, are operating to display an image output from such decoder on the main screen area of the display unit 7. When a scene attracting the user's interest is displayed on the subsidiary screen area of the display unit 7, for example, a scene that a shoot is to be made in the soccer game is displayed, the user can turn on 13-Segment tuner 1 and 13-Segment decoder 2 to display such scene on the main screen area of the display unit 7.

More specifically, when the instruction of saving battery power during a displaying operation is entered through the user I/F 8, the control unit 6 ceases supplying battery power to 13-Segment tuner 1 and 13-Segment decoder 2, and gives an instruction to the display controller 5 to display an image of the standard resolution output from the single-Segment tuner 3 and single-Segment decoder 4 on the main screen area of the display unit 7 (hereafter, this state is referred to as "power saving mode"). When an instruction is entered through the user I/F 8 in the power saving mode to perform a normal displaying operation, the control unit 6 resumes supplying battery power to 13-Segment tuner 1 and 13-Segment decoder 2, and gives an instruction to the display controller 5 to display an image of a high resolution output from 13-Segnebt tuner 1 and 13-Segment decoder 2 on the main screen area of the display unit 7.

While using the portable-type television receiver operated by a battery, the user can reduce battery power consumption by reviewing scenes of the standard resolution, which are not so important or interesting for him or her, and watching scenes of a high resolution, which are important or interesting for him or her.

In the above embodiments, the invention of apparatuses has been described, in which a control program previously stored in the control unit 6 is executed. But it is possible to read out the control program from external recording media such as CD-ROM, DVD, memory card, and the like, and/or to download the control program via a network such as the Internet, and to install such control program in a non-volatile memory such as a hard disk of a personal computer having a function of receiving television broadcasts. This case provides an invention of a program.

A control program according to the present invention, i.e. a control program for a television receiver which receives television broadcasts each delivering one and the same program which has been compressed into data of more than two separate resolutions, the control program comprising the steps comprising:

first step of receiving one television broadcast channel delivering data of plural separate resolutions in response to a channel selector signal and expanding data of a higher resolution among the data of separate resolutions and outputting an image of a higher resolution;

second step of receiving one television broadcast channel delivering data of plural separate resolutions in response to the channel selector signal, and expanding data of a lower resolution among the data of plural separate resolutions and outputting an image of a lower resolution;

third step of displaying the image output at the first step on a first area of display means, and displaying the image output at the second step on a second area of the display means; and fourth step of responding to a channel switch instruction entered through operation means to switch the television broadcast displayed on the first area of the display means to the television broadcast displayed on the second area of the display means, and of displaying the image output at the second step on the first area of the display means until an image of the television broadcast switched in response to the channel switch instruction is output at the first step.

In the forth step, a still image output at the second step is displayed on the first area of the display means until the image is output at the first step.

The control program further comprises fifth step of storing the compressed image received at the second step in storing means, wherein at the fourth step, when the channel switch instruction is entered through the operation means, the compressed image stored in the storing means is expanded at the second step and displayed on the first are of the display means until the image is expanded and output at the first step.

The control program comprises the fifth step of storing in the storing means the image which is expanded at the second step, wherein at the fourth step, when the channel switch instruction is entered through the operation means, the image stored in the storing means is displayed on the first area of the display means at the forth step until the image is expanded and output at the first step.

At the third step, a still image generated at the second step is displayed on the second area of the display means.

At the third step, when an instruction is entered through the operation means to save power during a display operation, power supply to a circuit for performing the expanding process at the first step is ceased, and the image output at the second step is displayed on the first area of the display means, and when an instruction is entered from the operation means during the display operation in a power saving manner to perform a normal display operation, power supply is resumed to the circuit for performing the expanding process at the first step and the image output at the first step is displayed on the first area of the display means.

What is claimed is:

1. A television receiver for receiving television broadcasts, each delivering the same television program compressed into images of at least two different resolutions, the television receiver comprising:

first signal processing means for receiving a first television broadcast channel among plural television broadcast channels in response to a channel selector signal, and for expanding an image of a higher resolution among the images of different resolutions delivered by the received first television broadcast channel and outputting the expanded image of a higher resolution;

second signal processing means for receiving a second television broadcast channel among the plural television broadcast channels in response to a channel selector signal, and for expanding an image of a lower resolution among the images of different resolutions delivered by the received second television broadcast channel and outputting the expanded image of a lower resolution;

display control means for displaying the image output from the first signal processing means on a first area of a display, and for displaying the image output from the second signal processing means on a second area of the display; and channel-switch instructing means, responsive to an entered channel switch instruction to switch the television broadcast channel whose image is displayed on the first area of the display to the second television broadcast channel, for instructing the display control means to display the image of the television program being delivered by the received second television broadcast channel output from the second signal processing means on the first area of the display until the first signal processing means which has received the second television broadcast channel in response to the channel switch instruction outputs an image of the television program being delivered by the received second television broadcast channel.

2. The television receiver according to claim 1, wherein the channel-switch instructing means instructs the display control means to display a still image output from the second signal processing means on the first area of the display until the first signal processing means outputs an image.

3. The television receiver according to claim 1, further comprising:

storing means for storing the compressed image received by the second signal processing means, wherein the channel-switch instructing means instructs the display control means to display an image output from the second signal processing means which has expanded the compressed image stored in the storing means on the first area of the display until the first signal processing means outputs an image, when the channel switch instruction is entered.

4. The television receiver according to claim 1, further comprising:

storing means for storing the image expanded by the second signal processing means, wherein the channel-switch instructing means instructs the display control means to display the expanded image stored in the storing means on the first area of the display until the first signal processing means outputs an image, when the channel switch instruction is entered.

5. The television receiver according to claim 1, wherein the display control means displays a still image generated by the second signal processing means on a third area of the display.

6. The television receiver according to claim 1, wherein the channel-switch instructing means ceases supplying power to the first signal processing means and instructs the display control means to display the image output from the second signal processing means on the first area of the display, when an instruction is entered to save power during a displaying operation, and resumes supplying power to the first signal processing means and instructs the display control means to display the image output from the first signal processing means on the first area of the display, when an instruction is entered to perform a normal displaying operation.

7. A computer-readable storage medium having stored thereon a control program that is executable by a computer of a television receiver which receives television broadcasts, each delivering the same television program compressed into images of at least two different resolutions, the program being executable by the computer to perform processes comprising:
- a higher resolution image obtaining process comprising receiving a first television broadcast channel among plural television broadcast channels in response to a channel selector signal, and expanding an image of a higher resolution among the images of different resolutions delivered by the received first television broadcast channel to output the expanded image of a higher resolution;
- a lower resolution image obtaining process comprising receiving a second television broadcast channel among the plural television broadcast channels in response to a channel selector signal, and expanding an image of a lower resolution among the images of different resolutions delivered by the received second television broadcast channel to output the expanded image of a lower resolution;
- displaying the image output by the higher resolution image obtaining process on a first area of a display, and displaying the image output by the lower resolution image obtaining process on a second area of the display; and
- responsive to an entered channel switch instruction to switch the television broadcast channel whose image is displayed on the first area of the display to the second television broadcast channel, displaying the image of the television program being delivered by the received second television broadcast channel output by the lower resolution image obtaining process on the first area of the display until the higher resolution image obtaining process outputs an image of the television program being delivered by the second television broadcast channel.

8. The computer-readable storage medium according to claim 7, wherein responsive to the entered channel switch instruction, a still image output by the lower resolution image obtaining process is displayed on the first area of the display until an image is output by the higher resolution image obtaining process.

9. The computer-readable storage medium according to claim 7, further comprising:
- storing the compressed-image received at the lower resolution image obtaining process;
- wherein responsive to the entered channel switch instruction, the stored compressed-image which is expanded by the lower resolution image obtaining process is displayed on the first area of the display until an image is expanded and output by the higher resolution image obtaining process.

10. The computer-readable storage medium according to claim 7, further comprising:
- storing the image expanded by the lower resolution image obtaining process;
- wherein responsive to the channel switch instruction, the stored image is displayed on the first area of the display until an image is expanded and output by the higher resolution image obtaining process.

11. The computer-readable storage medium according to claim 7, wherein a still image generated by the lower resolution image obtaining process is displayed on a third area of the display.

12. The computer-readable storage medium according to claim 7, wherein when an instruction is entered to save power during a display operation, power supply to a circuit for performing the expanding in the higher resolution image obtaining process is ceased, and the image output by the lower resolution image obtaining process is displayed on the first area of the display, and when an instruction is entered during the display operation performed in a power saving manner to perform a normal display operation, power supply to the circuit is resumed and the image output by the higher resolution image obtaining process is displayed on the first area of the display.

* * * * *